(12) United States Patent
Gottschalk

(10) Patent No.: US 6,902,176 B2
(45) Date of Patent: Jun. 7, 2005

(54) STEERING KNUCKLE AND ADJUSTABLE BOSS

(75) Inventor: Michael J. Gottschalk, Granville, OH (US)

(73) Assignee: The Boler Company, Itasca, IL (US)

( * ) Notice: Subject to any disclaimer, the term of this patent is extended or adjusted under 35 U.S.C. 154(b) by 180 days.

(21) Appl. No.: 10/356,636

(22) Filed: Feb. 3, 2003

(65) Prior Publication Data

US 2004/0150181 A1 Aug. 5, 2004

(51) Int. Cl.[7] .................................................. B62D 7/18
(52) U.S. Cl. ................................................. 280/93.512
(58) Field of Search ...................... 280/93.512, 93.511, 280/86.75; 384/262

(56) References Cited

U.S. PATENT DOCUMENTS

| | | | | |
|---|---|---|---|---|
| 1,438,214 | A | * 12/1922 | Brady et al. | ............ 280/93.512 |
| 1,932,340 | A | 10/1933 | Goltry | |
| 1,946,738 | A | * 2/1934 | Gulan et al. | ............ 280/93.512 |
| 2,076,852 | A | * 4/1937 | Leighton | ..................... 403/157 |
| 2,094,945 | A | 10/1937 | Hesselrode | |
| 2,187,249 | A | * 1/1940 | Schatz | ................... 280/93.512 |
| 2,311,125 | A | * 2/1943 | Phelps | ................... 280/93.512 |
| 2,428,651 | A | 10/1947 | Buese | |
| 2,512,881 | A | 6/1950 | Smiley | |
| 4,007,894 | A | * 2/1977 | Hartel | ................... 244/104 FP |
| 4,252,338 | A | * 2/1981 | Ingalls et al. | .......... 280/86.756 |
| 4,728,088 | A | 3/1988 | Smith | |
| 4,798,394 | A | 1/1989 | Pollock et al. | |
| 5,749,594 | A | 5/1998 | Krisher | |
| 6,113,118 | A | 9/2000 | Zebolsky | |
| 6,116,626 | A | 9/2000 | Cherry et al. | |
| 6,367,825 | B1 | 4/2002 | Kilpatrick | |
| 6,398,240 | B1 | 6/2002 | Taylor | |
| 6,616,156 | B1 | * 9/2003 | Dudding et al. | ....... 280/93.512 |

OTHER PUBLICATIONS

EPO Search Report, Jun. 14, 2004.

* cited by examiner

*Primary Examiner*—David R. Dunn
(74) *Attorney, Agent, or Firm*—Hall, Myers, Vande Sande & Pequignot

(57) ABSTRACT

A multi-piece steering knuckle having at least one boss which is adjustable in position along an axis of a king pin. More particularly, a steering knuckle including at least one boss having a threaded surface for threading to a mating surface of a yoke arm, the threaded surface allowing the boss to be selectively positioned along an axis of a king pin in a non-finite number of incremental positions. In another embodiment, a steering knuckle boss having an outwardly threaded surface for threading to a mating surface of a yoke arm and having, optionally, an inner wall composed of, at least in part, a nickel-aluminum bronze alloy.

18 Claims, 7 Drawing Sheets

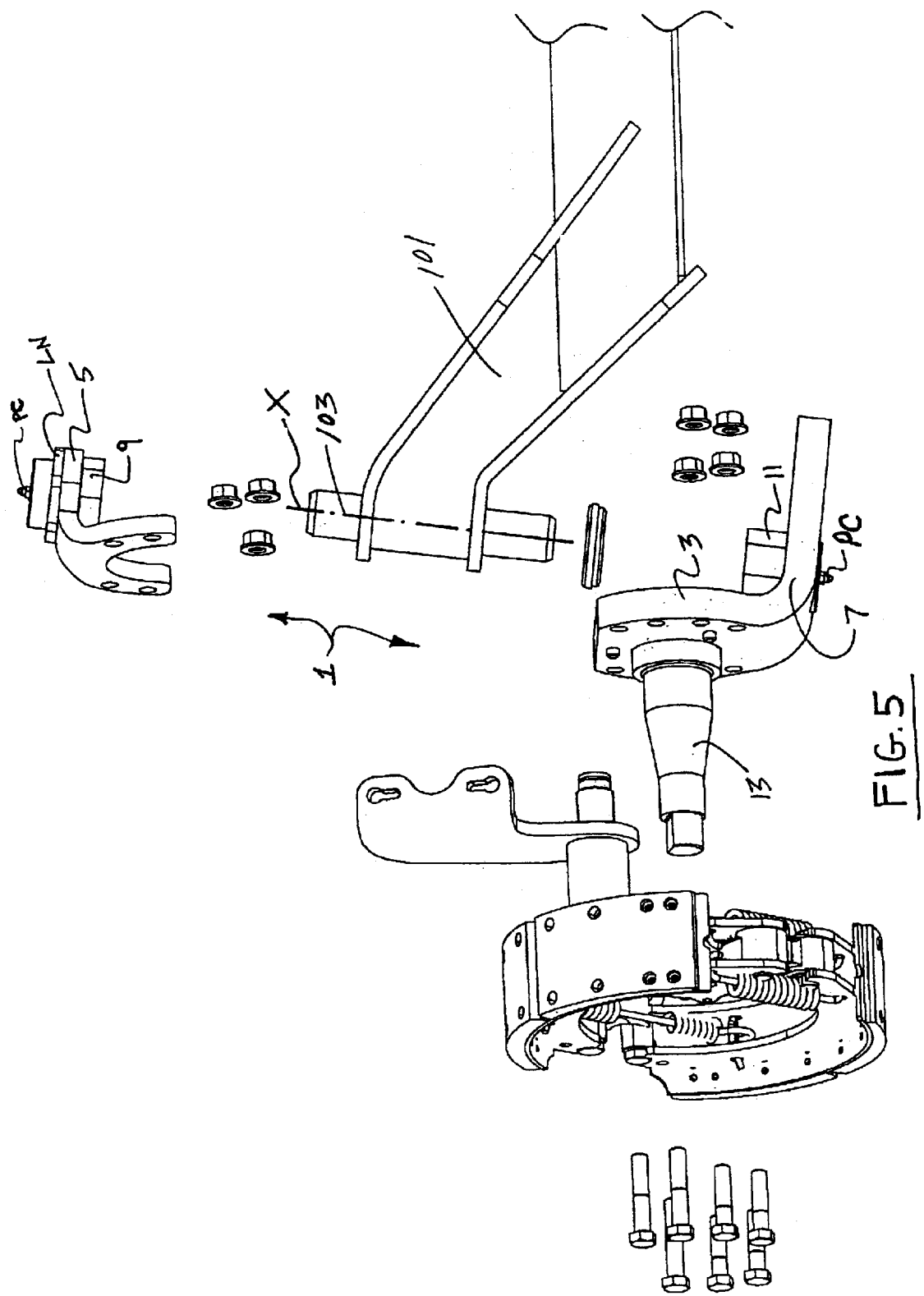

SECTION A-A

STEERING KNUCKLE AND ADJUSTABLE BOSS

FIELD OF INVENTION

This invention relates to steering assemblies for wheeled vehicles. In particular, this invention relates to such assemblies which may be provided with upper and lower yoke arms and at least one boss which is adjustable in position along an axis of an axle kingpin.

BACKGROUND OF INVENTION

The use of steering knuckles for carrying wheel assemblies is a long established practice for providing steerability to vehicle axles. As such, in addition to their use on various automobiles, steering knuckles are employed on a large number of commercial, light and heavy duty trucks in use today, and are utilized with both permanent (fixed) and auxiliary lift-type axles.

Steering knuckles of the known-type are generally constructed of upper and lower yoke arms carrying rigidly mounted upper and lower bosses (each having an aperture for receipt of a kingpin), as well as having a main body comprised of an integrated or press fit spindle extending centrally therefrom (for mounting a wheel assembly thereon). In conventional steerable axle construction, the beam of the axle normally includes a kingpin mounted at each end in a generally vertical orientation for assembly of a steering knuckle thereto. When assembled, the steering knuckle is mounted so that the kingpin ends reside i.e. ride in the apertures of the upper and lower bosses so that the knuckle can rotate back and forth about the axis of the kingpin thus providing steerability. Although conventional steering knuckle designs are widely used in the automotive arts, various drawbacks concerning the difficulties in assembly of such designs, as well as their wear rates during operation, have been discovered.

More particularly, because a kingpin is typically press-fit into an axle and thus referred to as "fixed" in location prior to assembly of a steering knuckle thereon, and because, in conventional steering knuckle design, a knuckle is of one-piece construction, there is substantial labor required to assemble such a steering knuckle to a "kingpinned" axle. Furthermore, maintenance or repair of a steering knuckle assembly is difficult because of the complications inherent in removing a one-piece steering knuckle from a fixed kingpin. Moreover, because of differences in manufacturing tolerances as well as differences in axle and kingpin designs (which may come from different manufacturers), the "fit" of a steering knuckle on a individual axle may often be imperfect and adjustments often must be made to improve the fit in order to achieve optimum performance and/or wear characteristics.

For example, after assembly of a steering knuckle to a kingpin, if there is a space between the kingpin seating area (the area of the axle surrounding the kingpin) and the upper or lower boss (thus leaving a gap between the axle and the boss such as gap "G" in FIG. 4b), unwanted movement of the kingpin relative to the knuckle occurs during vehicle operation. More specifically, when such a gap between a boss and the axle exists after assembly, the kingpin is prone to oscillate within the apertures of the bosses when a vehicle employing the axle is operated. This oscillation (i.e. pumping of the kingpin in and out of the boss apertures), in turn, creates alternating high and low pressure pockets within the boss apertures that create a vacuum which sucks up dirt or other debris into the bosses, ultimately causing wear to the kingpin as well as to the bearing and/or bushing surfaces located within the apertures of the bosses.

Several prior art attempts have been made to solve these problems associated with the failure to acceptably seat the steering knuckles and contacting parts in steerable axles, particularly in heavy duty vehicles such as trucks and trailers.

One known prior art technique for solving this problem involves manually adding shims over the kingpin during knuckle installation to occupy unwanted space between the bosses and the kingpin seating area. As will be recognized, this option requires additional labor and parts, and further relies on a trial and error approach when attempting to, hopefully, end up with the appropriate/ideal distance between bosses and the axle (i.e. the assembler must guess at the correct number of shims which must be added to eliminate the "gap").

More recent attempts to solve this and other problems have involved the use of multi-piece knuckles employing bolt-on yokes or bosses such as exemplified by U.S. Pat. No. 6,367,825 (hereinafter the '825 patent). Although the '825 patent addresses the problem described herein, the range of adjustability which is achieved by the mechanism described in the '825 patent is finite (i.e. restricted) because adjustment is limited to the increments determined by the size of the teeth of the boss and knuckle (flange) mating portions i.e. the boss can only be adjusted a distance which is a factor of the size of the mating teeth.

It is, of course, desirable to have the capability to adjust the position of a boss in a greater number (e.g. non-finite number) of increments so as to create a more precise "fit". In short, such adjustability would provide the capability for fine tuning the fit of a steering knuckle on a steerable axle thus reducing part wear rates and decreasing labor costs.

In view of the above, it is apparent that there exists a need in the art for apparatus which overcomes the above drawbacks. It is a purpose of this invention to fulfill this need, as well as other needs in the art which will become apparent to the skilled artisan once given the above disclosure.

SUMMARY OF INVENTION

Generally speaking, this invention fulfills the above-described needs in the art by providing for a steerable axle of a wheeled vehicle, a steering knuckle comprising:

a knuckle body having a spindle extending therefrom for assembly of a wheel thereto;

an upper yoke arm having attached thereto a first boss which includes a first aperture for receiving a first end of a kingpin;

a lower yoke arm having attached thereto a second boss which includes a second aperture for receiving a second end of a kingpin;

at least one of the upper and lower yoke arms and its respective boss attached thereto including matable threaded portions such that the respective matable boss is threadably adjustably attached to the at least one yoke arm.

In certain preferred embodiments, the degree of adjustability is sufficient to substantially completely eliminate any gap between the boss and the axle.

In another embodiment of this invention there is provided in a steering axle assembly which includes a steering knuckle comprising a knuckle body having upper and lower yoke arms extending therefrom; each upper and lower yoke arm having a boss having an aperture for receiving an end of a king pin, and the knuckle body having a spindle extending therefrom for assembly of a wheel thereto, the improvement comprising a system for attaching and disconnecting the steering assembly from said axle; at least one boss comprising:

a tubular member having at least a portion thereof which is threaded; and wherein the at least one boss is substantially vertically adjustable with respect to the king pin.

IN THE DRAWINGS

FIG. 5 is a three-dimensional exploded view of the embodiment illustrated in FIG. 4A.

DETAILED DESCRIPTION OF CERTAIN EMBODIMENTS

Figure 1:
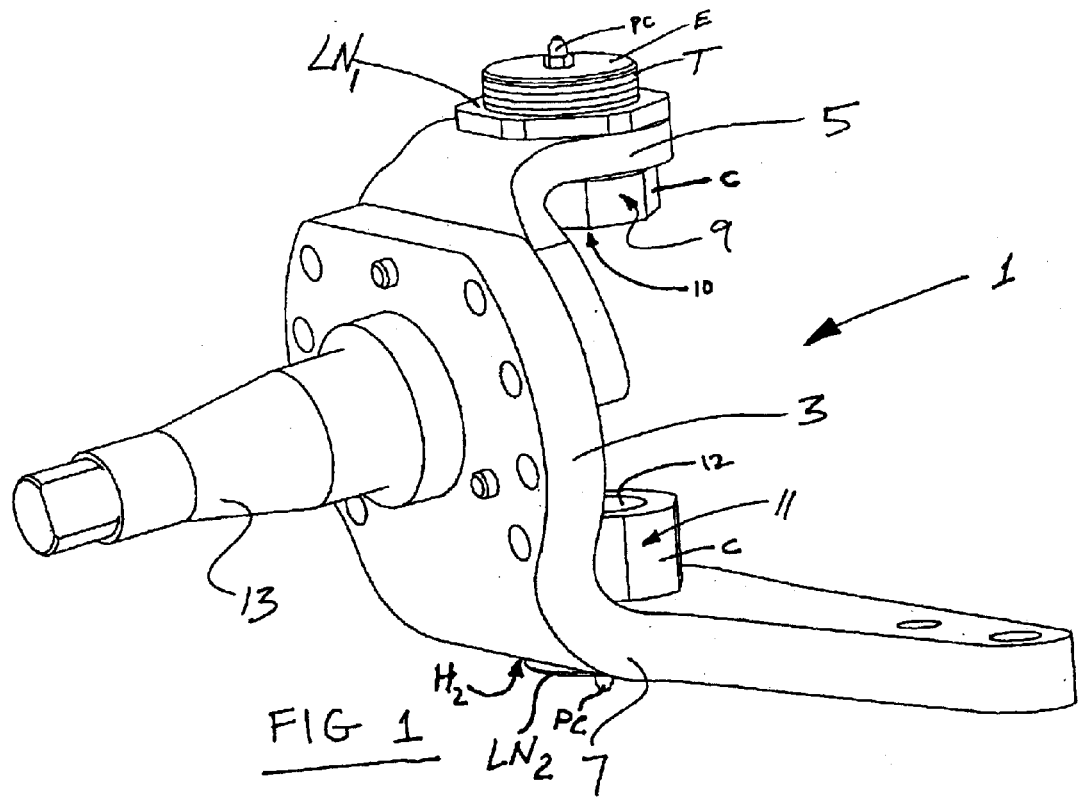
FIG. 1 is a three-dimensional view of one embodiment of a steering knuckle according to the subject invention.
Figure 2:
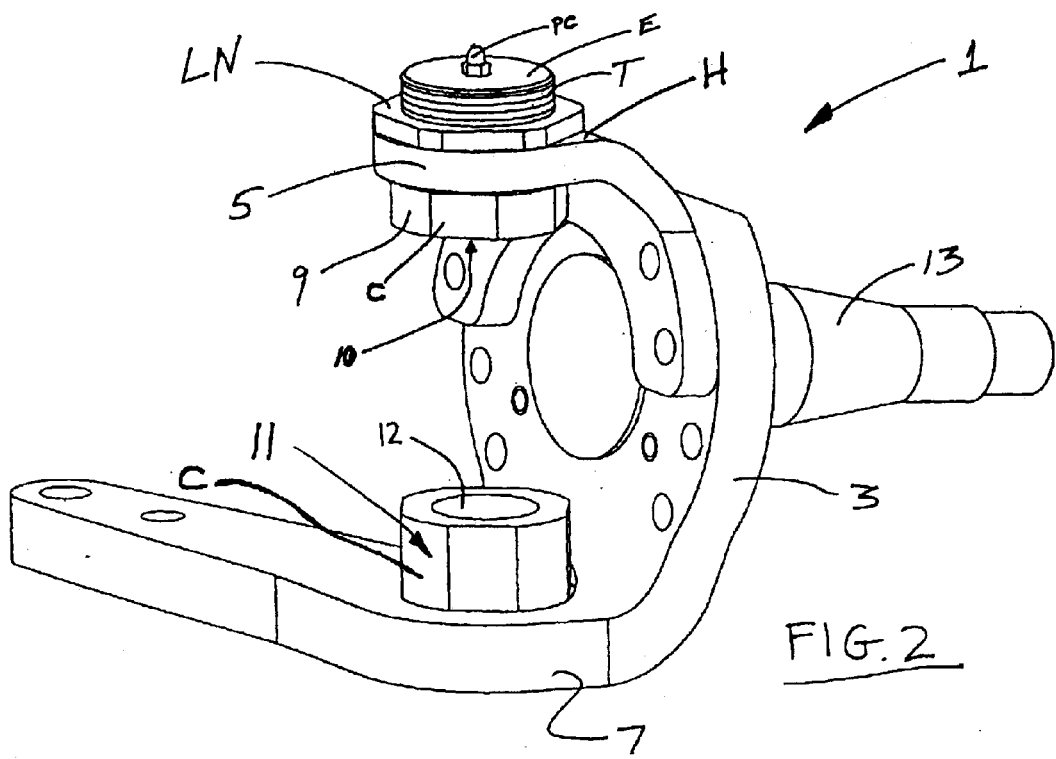
FIG. 2 is a second three-dimensional view of the embodiment illustrated in FIG. 1.
Figure 3:
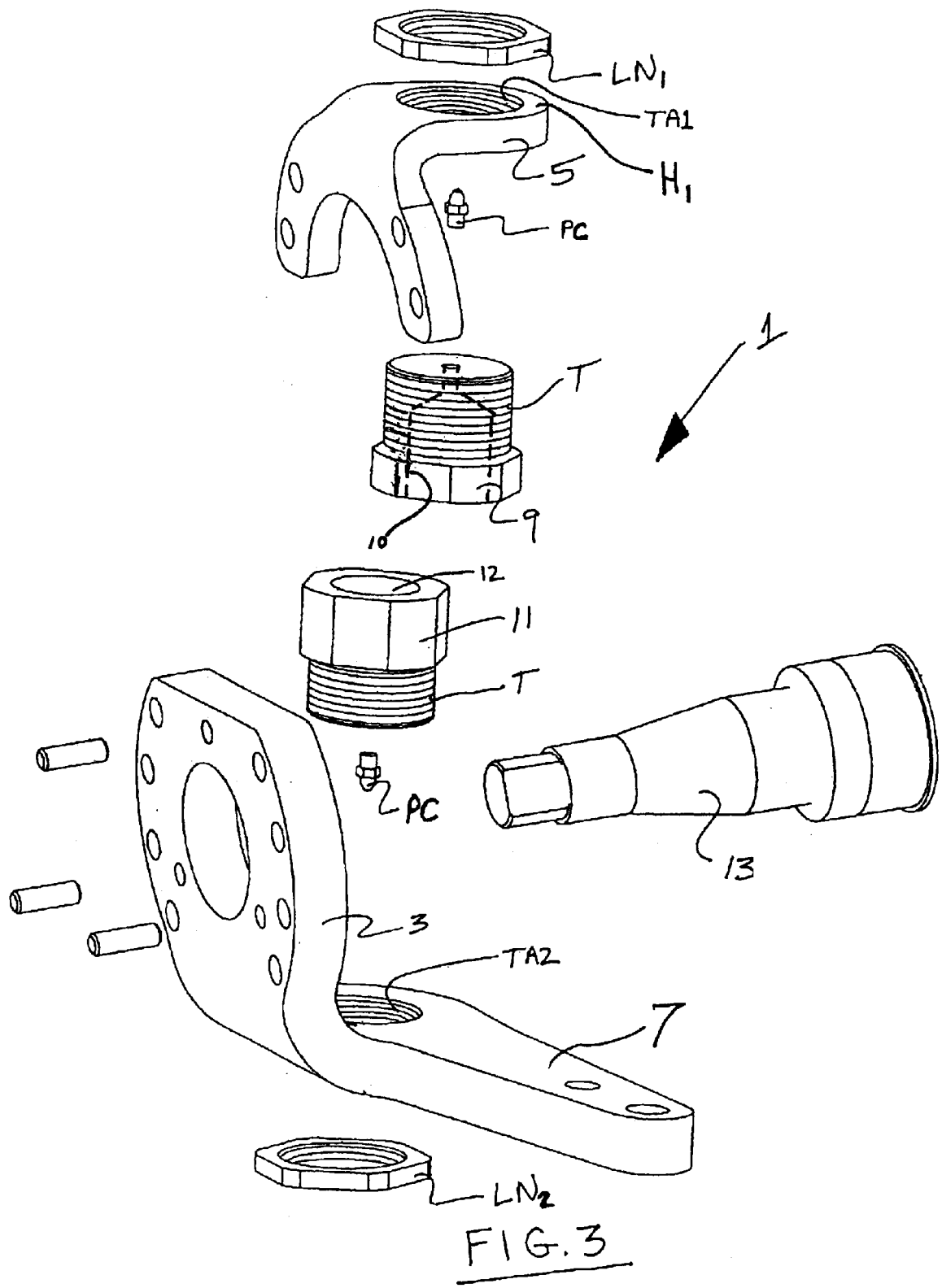
FIG. 3 is a three-dimensional exploded view of the embodiment of the steering knuckle illustrated in FIG. 1.

Referring now initially to FIGS. 1–3 an exemplar embodiment of a steering knuckle according to the subject invention is illustrated therein. As illustrated, a steering knuckle 1 according to this invention generally comprises a main body 3 having upper and lower yoke arms 5 and 7, respectively, extending therefrom, and spindle 13 for mounting a wheel assembly thereon. As may be seen most clearly in FIG. 3, steering knuckle 1 is in this embodiment a generally conventional fabricated knuckle constructed of multiple forged, cast, and/or machined parts. Other specific knuckle designs are, of course, contemplated for use within the scope of this invention. In this embodiment, as illustrated, as well as in other known types of steering knuckles, upper yoke arm 5 is a bolt-on part and may be removed or attached selectively as needed for the more simplified installation and removal of steering knuckle 1 from an axle mounted kingpin. Alternatively, however, in other known embodiments, yolk arm 5 may be formed integrally with main body 3, or, in another know embodiment, both yolk arms 5 and 7 may be fabricated, removable parts. Likewise, spindle 13 may be fabricated and press fit into main body 3, or, in the alternative, (both known and conventional) spindle 13 may be machined or forged as an integral part thereof. Selection of the specific embodiment which is employed, in this regard, may be made based on cost and/or weight considerations, for example, or by specific customer request, the various advantages of certain embodiments being discussed in more detail below.

Figure 4A:
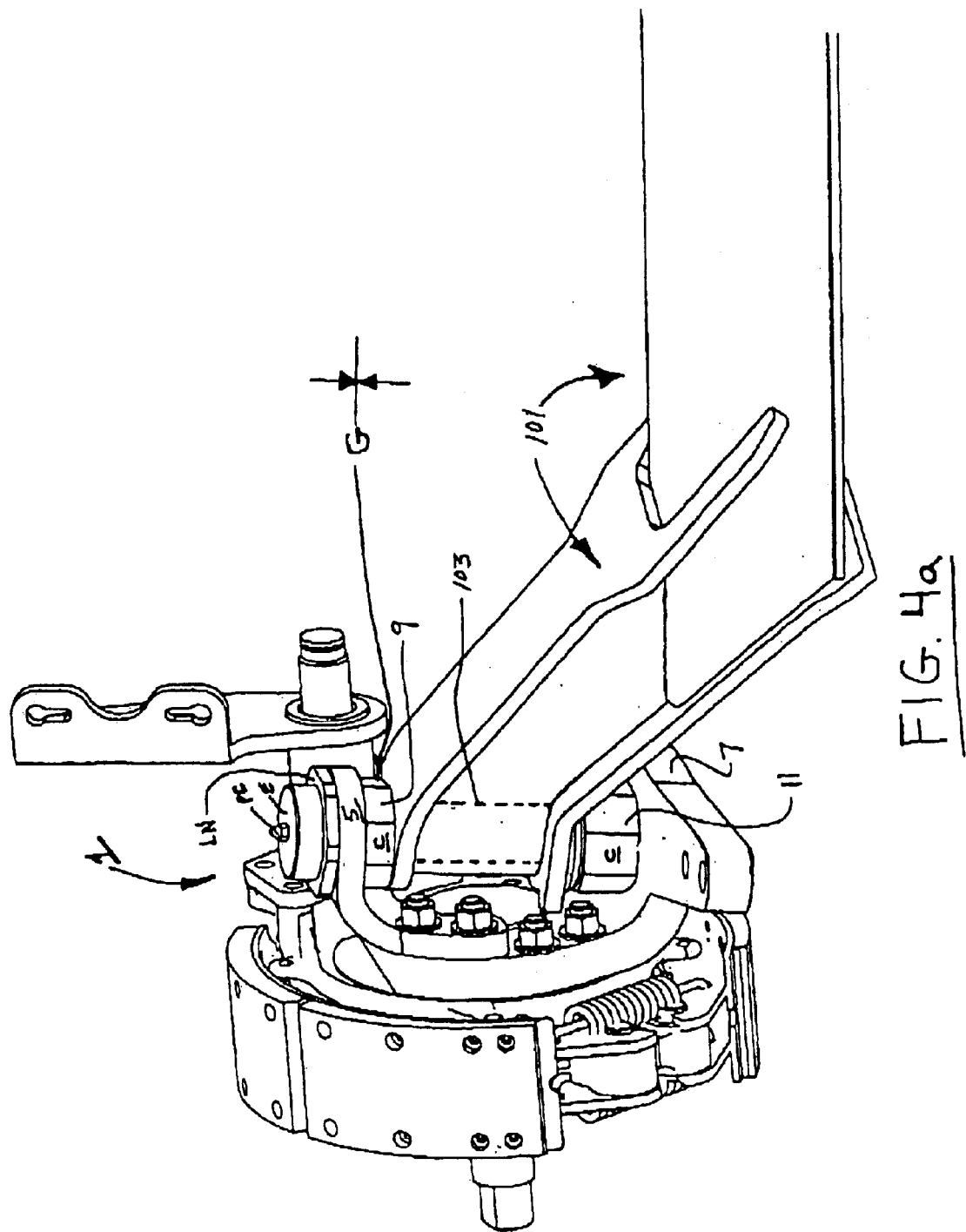
FIG. 4A is a three-dimensional view of one embodiment of the steering knuckle and steerable axle assembly according to the subject invention in which the undesirable gap "G" has been substantially eliminated by adjustment of an appropriate boss according to this invention.
Figure 4B:
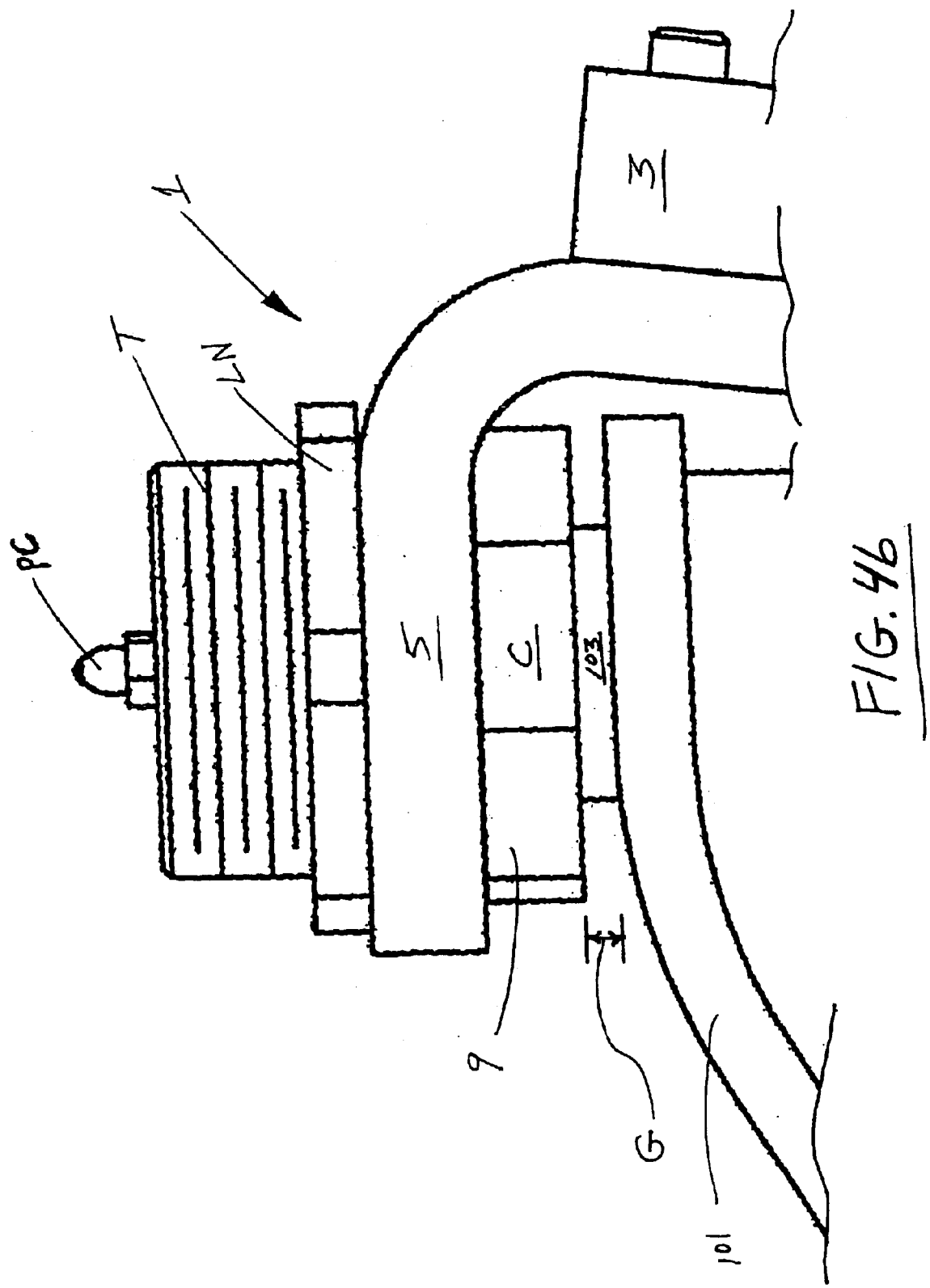
FIG. 4B is a partial, profile view of the yoke arm and boss of the steering knuckle illustrated in FIG. 4A shown illustrating a typical and undesirable gap "G" prior to its elimination by adjustment of a boss according to this invention.
Figure 4C:
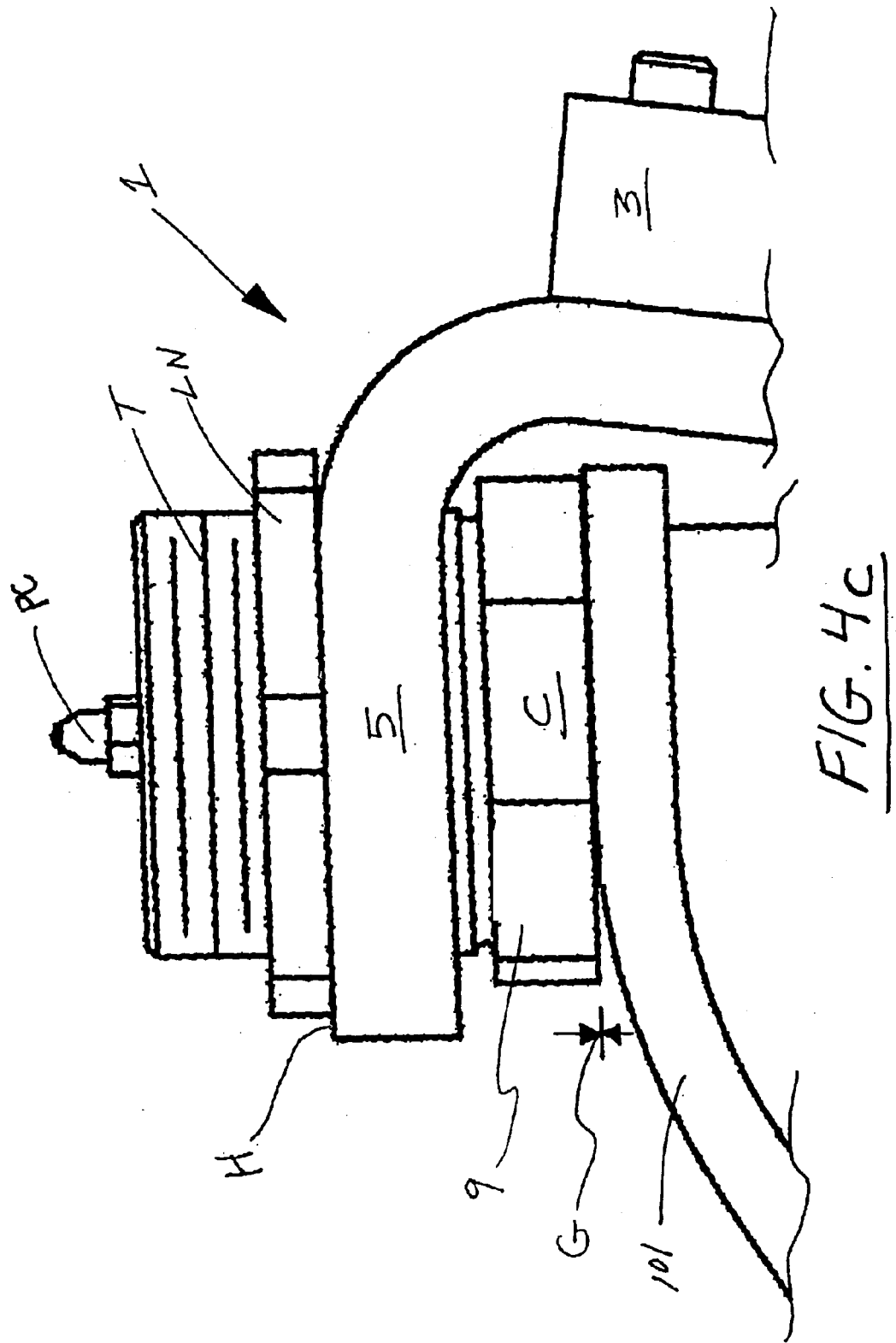
FIG. 4C is a partial, profile view of the yoke arm and boss of the steering knuckle according to FIG. 4A illustrating more fully the substantial elimination of gap "G".

Turning now to FIGS. 4a–4c, the environment in these drawings illustrates a particularly preferred, and common steerable axle steering knuckle combination in which the subject invention finds utility. As illustrated, steering knuckle 1 is assembled to a conventional steerable axle 101 (e.g. an I-beam or fabricated type axle) having kingpin 103 (x-ray dotted lines) press-fit therein. Assembled as such, kingpin 103 rides in apertures 10 and 12 (see FIGS. 3 and 6A) of bosses 9 and 11 respectively. In this construction, steering knuckle 1 is free to pivot about the longitudinal axis x (FIG. 5) of kingpin 103 thereby providing steerability. FIG. 4a, in this respect, has been illustrated to depict a situation in which an ideal fit of steering knuckle 1 on axle 101 has been achieved by this invention in that gap "G" is substantially eliminated. The term substantially is used herein to allow a minor tolerance between the two parts, on the order of no more than 0.005. In the most preferred embodiments, the parts are in contact such that the gap "G", for all intents and purposes, may be said to be zero or non-existent.

In typical prior art practice, this essentially zero gap "fit" of the two parts was only achieved through precise manufacturing standards and/or a careful, time consuming part matching process or through other measures such as the addition of shims on the kingpin to eliminate the above-mentioned gaps (and the subsequent drawbacks associated with these solutions). Attention is thus directed to FIG. 4b which best illustrates the fit problem of the prior art as one of the several problems which the instant invention solves.

In particular, FIG. 4b illustrates a close-up view of the "fit" relationship between boss 9 and kingpin 103 when steering knuckle 1 is installed thereon and boss 9 has not yet been adjusted to eliminate the gap. More particularly, FIG. 4b illustrates the gap "G" which is typically present when a steering knuckle is installed on a conventional steerable axle (and which was formerly eliminated by the addition of prior art shims). As aforesaid, the presence of gap "G" is undesirable and results in poor vehicle performance as well as increased wear rates on the steering knuckle and kingpin. For these reasons, it is desirable to eliminate, to a substantial extent, gap "G" so that, in the preferred embodiments, an operative non-gap exists between boss 9 and axle 101 prior to the axle being installed on a vehicle. In this regard, a particularly efficacious embodiment of the inventive steering knuckle in which the substantial elimination of gap "G" has been effected, is illustrated in FIG. 4c.

In this respect, one or both of bosses 9 and/or 11 is/are adjustably connected (as by screw threaded connection) to upper and lower yoke arms 5 and 7, respectively, where they extend substantially vertically therefrom (the term "vertically" being defined broadly as employed herein so as to merely indicate a general orientation, and not a specific angular limitation, as would be encountered in conventional steering knuckle design). More particularly, as may be seen in FIG. 3, at least one, and preferably each, yoke arm 5 and 7 is provided with a threaded aperture "TA1" and "TA2" and thus at least a corresponding one, and preferably each boss 9 and 11 includes, along at least a portion of its outer circumference, threads "T" for threadably mating with correspondingly threaded apertures "TA1" and "TA2". Specifically, threads "T" are provided so that at least one or each boss 9 and 11 can be attached to its respective yoke arm (5 or 7) in a selectively adjustable manner. More specifically, during the final stages of assembling steering knuckle 1 on a "kingpinned" axle (or at any other desirable time such as disassembly for example), either or both of bosses 9 and 11 may be threaded into or out of threaded aperture "TA1" or "TA2" (by clockwise or counter clockwise rotation) in order to select a distance which collar "C" (see FIGS. 1 and 2) of the bosses will extend from the yoke arms respectively, thereby selecting the distance between boss 9 (and/or 11) and axle 101 (i.e. gap "G"). This selected distance is adjusted as appropriate, in turn, to achieve the correct fit of steering knuckle 1 on kingpin 103 of the axle such as illustrated in FIG. 4c. In this respect, it will be understood by those skilled in the art that the "fit" should not be so tight as to create a form of inoperativeness in the system by not allowing appropriate articulation of the parts as experienced in the operation of the vehicle.

By example, and referring again to FIG. 4b, if there is a ¼ inch distance (approximated by gap "G" in the figure) between boss 9 and the kingpin seating area (i.e. axle 101), then, upon installation of steering knuckle 1 on kingpin 103, boss 9 is simply rotated counterclockwise to back (i.e. thread) the boss out from yoke 5 approximately ¼ inch, thus substantially eliminating gap "G" as illustrated in FIG. 4c. Alternatively, both bosses 9 and 11 can be threaded inwardly or outwardly (i.e. clockwise or counterclockwise), each being adjusted an appropriate distance/amount so that the cumulative distance between the two bosses is reduced by ¼ inch and the distance between the bosses and the axle surface is thus reduced to substantially zero (as noted above, it is desirable to leave a very minimal distance between the bosses and the axle after adjustment so that friction is not so great as to induce excessive contact between bosses 9 and/or 11 and axle 101). An example of such a minimal distance can range from 0.0005 (essentially a zero gap) to 0.005 (which may be herein referred to as the "substantial elimination" of the gap or, synonymously, that the gap has been "substantially eliminated"), thereby to achieve the purposes of this invention.

As is now apparent given the above description of these particular embodiments, by simply threading either or both of bosses 9 and/or 11 further into or out of yoke arms 5 and/or 7 (by hand or by tool as described below), a substantially "perfect fit" of steering knuckle 1 on an axle can be achieved. This, of course, as aforesaid, prevents or reduces the amount of oscillation of kingpin 103 within boss apertures 10 and 12 during vehicle operation and therefore reduces stress on the kingpin, the axle, and the steering knuckle. It, furthermore, decreases the amount of debris which is drawn (i.e. "vacuumed") into the boss apertures thereby lessening kingpin and bushing wear.

Similarly, in addition to the adjustable features, boss 9 and/or 11 may be completely and easily removed from its respective yoke arm thereby facilitating easy assembly of the knuckle to an axle kingpin. In order to remove a boss, it is simply turned counter-clockwise until it is completely unthreaded. As will become immediately apparent, when a boss is removed, a steering knuckle can then be simply installed on or uninstalled from a kingpin during initial assembly or during repair. In still additional embodiments, at least one yoke arm (e.g. yoke arm 5) may be constructed so as to be removable from base structure 3 with its integral yoke arm 7, and in this respect may be a fabricated part which, in addition to providing ease of kingpin/axle installation, simplifies the manufacture of the knuckle as well as in some cases reducing its manufacturing cost.

It is noted, that either both or, alternately, only one boss 9 or 11 need be adjustable and/or removable to achieve the objectives of the subject invention, and thus alternative embodiments in which one of bosses 9 or 11 is fixed non-adjustably to a yoke arm are contemplated. In further alternative embodiments, the location of threads "T" and the precise design of yoke arms 5 and 7 may deviate from that as illustrated in the drawings, the important feature being, of course, the degree of adjustability which the threading provides.

In order to secure boss 9 and/or 11 in place once a desired location of the boss has been attained (e.g. through the adjustment procedures described above), locknut "LN" is provided and may be threaded onto boss end "E" (which protrudes from its respective yoke arm, see FIGS. 1 and 2) so that a surface of each of locknuts $LN_1$ and $LN_2$ (if both bosses, as shown, are to be adjustable) is threaded into substantial engagement with its respective substantially horizontal surface $H_1$ and $H_2$ associated with its respective aperture "TA1" and "TA2". Once locknuts $LN_1$ and $LN_2$ (if both are to be adjustable, as illustrated) are threaded into position as such, the boss to which each is threaded is substantially "locked" into position i.e. is prevented from substantial vertical travel in either the "up" or "down" direction. More particularly, once locknut(s) $LN_1$ and $LN_2$ is/are threaded into place, vertical travel or articulation of the respective boss is effectively prevented or minimized by the position of locknuts $LN_1$ and/or $LN_2$ while travel in the "down" direction is effectively blocked by the bosses physical proximity to the kingpin seating area (i.e. axle 101). In effect, a boss is now locked in the most desirable fit position as was selected by the assembler for any particular axle assembly.

Figure 6C:
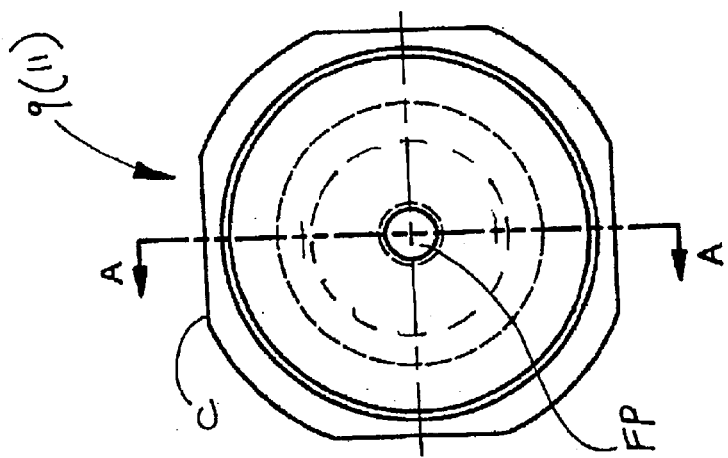
FIG. 6C is an end, x-ray view of the embodiment of the adjustable boss illustrated in FIG. 6B.
Figure 6B:
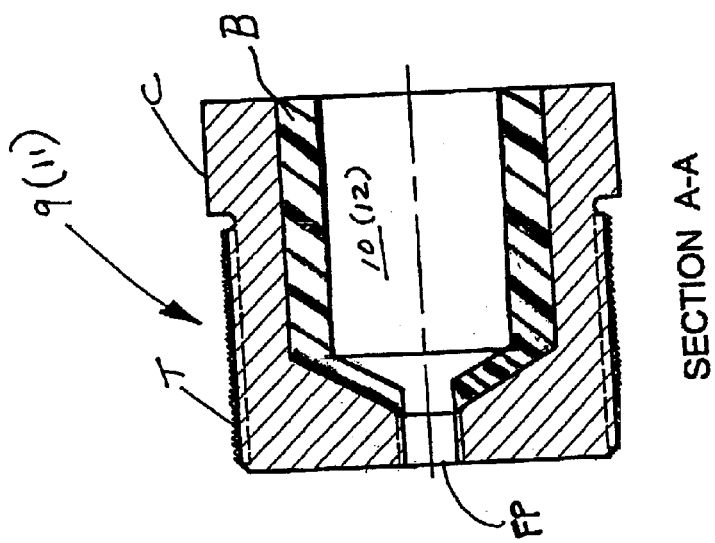
FIG. 6B is a side sectional view of the embodiment of the adjustable boss illustrated in FIG. 6A.
Figure 6A:
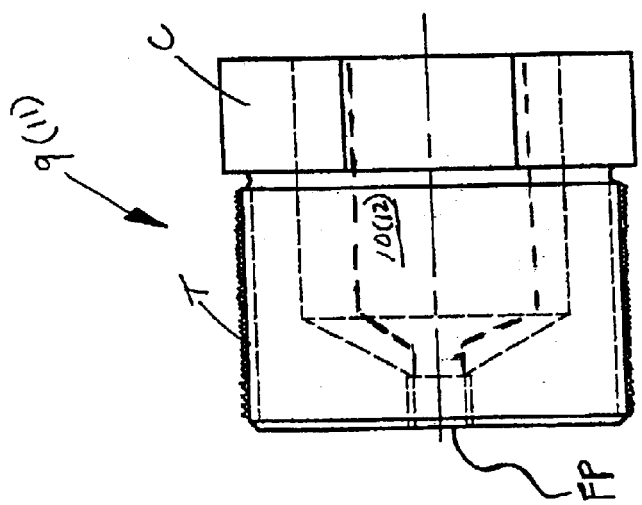
FIG. 6A is a side, x-ray view of an adjustable boss according to one embodiment of the subject invention.

Referring now to FIGS. 6a–c, an exemplar embodiment of boss 9 is illustrated in greater detail. Boss 11, it will be understood, is a substantial duplicate thereof in the embodiments herein as noted by the "(11)" in the figures. While not required, collar "C" of boss 9 is preferably provided with an outer octagonal surface so that the respective boss may be more easily gripped such as by a wrench or other tool for ease of adjustment, insertion, and removal. This, of course, allows the position of boss 9 and 11 to be adjusted more easily by providing a built in mechanism for aiding with threading and unthreading the boss. Furthermore, because in conventional steering knuckle design, it is desirable to provide a lubricant (e.g. grease) to the housed portion of the kingpin as well as to the bearing/bushing surfaces (within boss apertures 10 or 12) bosses 9 and 11 include a fill port "FP" (e.g. a small threaded aperture) through which grease or other lubricant may be added. Using a lubricant, such as grease, reduces friction between parts thus reducing wear and aiding in the free rotation of the boss about the kingpin (and thus the free rotation of the steering knuckle about the kingpin) which allows the axle to be steerable. As may be seen in FIG. 6b, fill port "FP" extends such that it connects to aperture 10 or 12, respectively, thus allowing lubricant to substantially fully coat kingpin 103 when it is installed therein (i.e. within both bosses apertures). In some embodiments, port caps "PC" (see FIG. 3) associated with boss 9 and 11, respectively, used to seal fill ports "FP" and simply thread into their respective port after lubricant has been added. In further, preferred embodiments, port caps "PC" optionally employ a conventional o-ring (not shown for convenience) to facilitate a leak proof seal.

Although in the illustrated embodiments bosses 9 and 11 are substantially identical in structure, in other alternative embodiments, one or both of bosses 9 and 11 may differ from the structure disclosed in these figures so long as at least one boss is adjustable relative to its respective yoke arm. For example, boss 11 may be permanently fixed to yoke arm 7 without departing from the spirit and scope of the subject invention.

Still further, in conventional practice, a bushing B (FIG. 6B) may be installed within apertures 10 and/or 12 prior to the installation of steering knuckle 1 on kingpin 103. Such a bushing provides increased wear resistance characteristics as well as reduces frictional resistance between the bosses and the kingpin (i.e. during rotation thereabouts). It has been discovered, however, that if boss 9 and/or 11 are/is constructed, in whole or in part, of a nickel-aluminum bronze alloy (an example of which is Material No. A023 manufactured by PIAD Corp. in Greensberg, Pa. and a part machined therefrom), bushing B is not required. FIGS. 6A–6C thus merely show this bushing B as an optional element. This is because such nickel-aluminum bronze alloys have proven to be particularly durable, while simultaneously providing a low-friction contact surface fully operative and suitable as a bushing/bearing material. In this regard, if the aperture of a steering knuckle boss is constructed of a nickel-aluminum bronze alloy (or the entire boss is constructed of such material) then the rather cumbersome step and additional cost of sizing and installing an independent bushing, such as bushing B, becomes unnecessary. As will be appreciated by those skilled in the art, by the elimination of the need for an independent bushing B, a significant enhancement in the scheduling of maintenance, etc., is achieved, because it was often the case in the prior art that king pin bushings would frequently wear out, requiring significant down time for their replacement, or at least a heightened frequency of maintenance checks to determine their degree of wear. By not having this bushing B, no machining to replace the bushing is required. Rather, if the boss wears out, it merely and simply is replaced.

Once given the above disclosure, many other features, modifications, and improvements will become apparent to the skilled artisan. Such other features, modifications, and improvements are therefore considered to be part of this invention, the scope of which is to be determined by the following claims:

I claim:

1. A steering knuckle for attachment to a steerable axle of a wheeled vehicle, said steering knuckle comprising:
    a knuckle body having a spindle extending therefrom for assembly of a wheel thereto;
    an upper yoke arm having attached thereto a first boss which includes a first aperture for receiving a first end of a kingpin;
    a lower yoke arm having attached thereto a second boss which includes a second aperture for receiving a second end of a kingpin;
    at least one of said upper and lower yoke arms and its respective boss attached thereto including matable threaded portions, wherein at least one of said first boss and said second boss is so designed so as to be threadably adjustably attached to its said respective arm; and
    wherein, at least, one of said first and second bosses is capable of being threadably adjusted to an extent sufficient to eliminate any substantial gap between said axle and said, at least, one boss when said steering knuckle is attached to a said steering axle.

2. A steering knuckle according to claim 1 wherein both said first and said second bosses are adjustable into a position which eliminates any said substantial gap, by clockwise or counterclockwise threading of a said adjustably attached boss into or out of its said threaded aperture.

3. A steering knuckle according to claim 2 further including locking means for substantially immobilizing said, at least, one adjustable boss in position when said matable boss is threaded into said threaded aperture.

4. A steering knuckle according to claim 3 wherein said locking means comprises a threaded nut member.

5. A steering knuckle according to claim 1 wherein when said matable boss is threaded into said threaded aperture and a desired boss position has been selected, said threaded nut member is so constructed so as to be threadable onto an end of said matable boss such that when said threaded nut member engages a portion of at least one of a said upper and lower yoke arm at an area proximal said threaded aperture, said matable boss is immobilized.

6. A steering knuckle according to claim 4 wherein said matable boss includes:
    a fill port located proximal an end of said boss for receiving lubricant therein.

7. A steering knuckle according to claim 6 wherein said aperture of said matable boss comprises at least one inner wall, said at least one inner wall comprising a first bearing surface.

8. A steering knuckle according to claim 7 wherein said at least one inner wall defines a substantially cylindrical opening having a second inner wall proximal an end thereof defining a taper, said taper comprising a second bearing surface.

9. A steering knuckle according to claim 8 wherein said first and said second bearing surfaces comprise at least in part:
    a nickel-aluminum bronze alloy.

10. A steering knuckle according to claim 4 wherein said matable boss includes proximal an outer wall a gripping surface for operation of a gripping tool thereon.

11. A steering knuckle according to claim 10 wherein said gripping surface includes at least two linear surface for operation of a gripping tool thereon.

12. A steering knuckle according to claim 4 wherein said matable boss comprises at least in parts a nickel-aluminum bronze alloy.

13. A steering knuckle according to claim 4 wherein at least one of said upper and lower yoke arms is removable from said steering knuckle.

14. A steering knuckle according to claim 13 wherein said removable yoke arm is attachable to said knuckle body employing attaching means for assembling said removable yoke arm to a portion of said knuckle body.

15. A steering knuckle according to claim 14 wherein said attaching means comprises at least a pair of bolts and a pair of bolt receiving apertures.

16. A steering knuckle according to claim 15 wherein said spindle is removable.

17. A steering knuckle according to claim 1 wherein both said upper and lower yoke arms have a threaded aperture for receipt of a boss therein and both said first and said second bosses comprise a tubular member having an outer wall, said outer wall having at least a portion thereof which is threaded.

18. A steering knuckle according to claim 1, wherein each said upper and lower arm and its respective boss are so designed such that each said respective boss is capable of being threadably adjusted to an extent sufficient to eliminate any substantial gap between said axle and said boss when said steering knuckle is attached to said axle.

* * * * *